(12) United States Patent
Marcia et al.

(10) Patent No.: US 8,793,769 B2
(45) Date of Patent: Jul. 29, 2014

(54) ZERO SIGN-ON AUTHENTICATION

(75) Inventors: Oscar Marcia, Broomfield, CO (US); Stuart Hoggan, Longmont, CO (US); Simon Krauss, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1006 days.

(21) Appl. No.: 12/650,664

(22) Filed: Dec. 31, 2009

(65) Prior Publication Data

US 2011/0158406 A1 Jun. 30, 2011

(51) Int. Cl.
| | |
|---|---|
| G06F 7/04 | (2006.01) |
| G06F 15/16 | (2006.01) |
| G06F 17/30 | (2006.01) |
| G06F 17/00 | (2006.01) |
| G06F 21/00 | (2013.01) |

(52) U.S. Cl.
USPC ...... 726/4; 726/2; 726/12; 713/176; 713/182; 380/200; 380/201

(58) Field of Classification Search
USPC ............. 726/2, 4, 12; 713/182, 176; 380/200, 380/201
See application file for complete search history.

(56) References Cited

U.S. PATENT DOCUMENTS

| | | | | |
|---|---|---|---|---|
| 8,281,379 B2 * | 10/2012 | Noe | | 726/8 |
| 2005/0166053 A1 * | 7/2005 | Cui et al. | | 713/176 |
| 2006/0005032 A1 * | 1/2006 | Cain et al. | | 713/182 |
| 2006/0020782 A1 * | 1/2006 | Kakii | | 713/156 |
| 2006/0031510 A1 * | 2/2006 | Beck et al. | | 709/226 |
| 2006/0059158 A1 * | 3/2006 | Ussery et al. | | 707/10 |
| 2006/0156392 A1 * | 7/2006 | Baugher | | 726/5 |
| 2006/0230278 A1 * | 10/2006 | Morris | | 713/182 |
| 2007/0233540 A1 * | 10/2007 | Sirota | | 705/8 |
| 2008/0098225 A1 * | 4/2008 | Baysinger | | 713/171 |
| 2008/0209464 A1 * | 8/2008 | Wright-Riley | | 725/25 |
| 2010/0042735 A1 * | 2/2010 | Blinn et al. | | 709/229 |
| 2010/0115132 A1 * | 5/2010 | Hirata et al. | | 709/245 |
| 2010/0205261 A1 * | 8/2010 | Michel | | 709/206 |
| 2010/0275251 A1 * | 10/2010 | Gross et al. | | 726/6 |

OTHER PUBLICATIONS

Subramanian, S.; Wang, P.; Durairaj, R.; Rasimas, J.; Travostino, F.; Lavian, T.; Doan Hoang, "Practical active network services within content-aware gateways," DARPA Active NEtworks Conference and Exposition, 2002. Proceedings , vol., No., pp. 344,354, 2002.*
Almenárez, Florina, et al. "TrustAC: Trust-based access control for pervasive devices." Security in Pervasive Computing. Springer Berlin Heidelberg, 2005. pp. 225-238.*

* cited by examiner

*Primary Examiner* — Luu Pham
*Assistant Examiner* — Kari Schmidt
(74) *Attorney, Agent, or Firm* — Great Lakes Intellectual Property, PLLC.

(57) ABSTRACT

A authenticating system and process for authenticating user devices to a access a media service where access to certain portions of the media service may be limited according to a gateway or other device used by a user device to facilitate interfacing a user with the media service. The authentication may be achieved without directly assessing a trustworthiness of the user devices, and optionally, without requiring a user thereof to complete a sign-on operation.

15 Claims, 2 Drawing Sheets

US 8,793,769 B2

ZERO SIGN-ON AUTHENTICATION

BACKGROUND OF THE INVENTION

1. Technical Field

The present invention relates to facilitating user access to media services without requiring a user to sign-on or enter a password as part of an authentication process required before permitting access to the media services.

2. Background

Within the satellite, broadcast, and cable television industries, and other media service based industries, more and more media services are being made available to users through different types of user devices. Users within the same home, for example, may be able to use multiple devices (such as mobile phones, laptop computers, media terminal adapter (MTA), etc.) to access media services that once were only available through a single type of device, such as television for watching video. While the ability of these different types of user devices to access the media services may be convenient and provide greater access to subscribers, the corresponding increase in the number of device based access points increases the security demands on service providers. Instead of simply securing a single access point within the home that has limited communication capabilities and that operates according to a more secure, and in some cases, proprietary operating systems, e.g., a television tuner or set-top box (STB), the service providers are now faced with the challenge of securing less secure devices that operate according to non-proprietary operating systems and that have multiple communications mediums.

Service providers have implemented sign-on based authentication processes in effort to address the security concerns associated with the increased number of user devices. Sign-on based authentication processes generally relying on the assistance of a security application or other feature operating on the user device to identify itself to the service provider and the service provider relying on this identification as part of an authentication process evaluation. With the security applications operating at the user device, and not on a server or other upstream device, the service providers are unable to relieve some of the related security processing burdens from the user devices. One sign-on based authentication system relies on certificates being assigned to each of the user devices and transmission of the certificates to the service provider each time one of the user devices attempts to access media services. Another sign-on process based authentication system relies on a user to manually sign-on to a website or other portal with a username and password prior to being granted media access (in some cases, cookies kept on the user device may be used to automatically sign-on the user for a specific amount of time (e.g., two weeks) or as long as the cookie is not deleted).

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
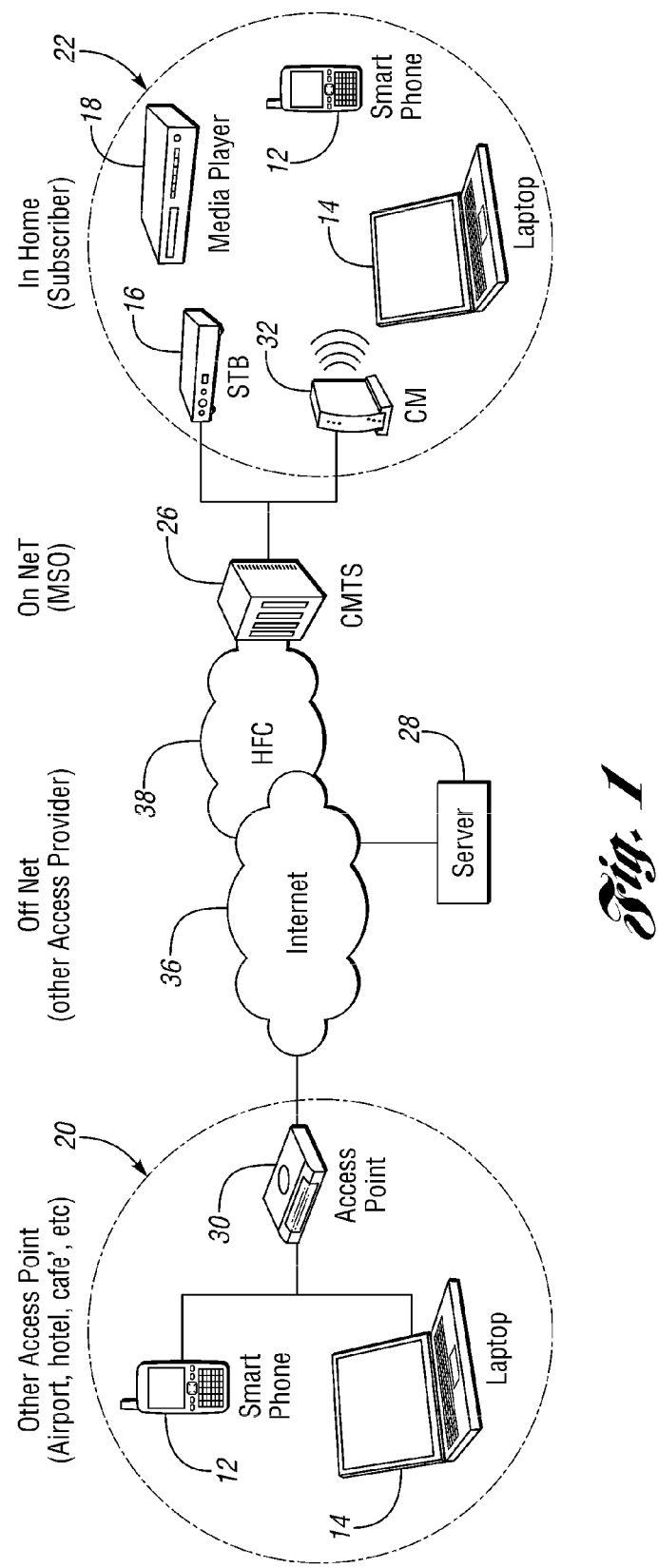
FIG. 1 illustrates a system configured to facilitate user access to media services in accordance with one non-limiting aspect of the present invention.

FIG. 1 illustrates a system 10 configured to facilitate user access to media services without requiring a user to sign-on or enter a password as part of an authentication process required before permitting access to the media services in accordance with one non-limiting aspect of the present invention. The system 10 supports user access to any type of suitable media service from a number of user devices, which for exemplary purposes are shown to include a mobile phone 12, laptop computer 14, settop box (STB) 16, and media player 18. Some of the user devices 12, 14, 16, 18, such as the mobile phone 12 and laptop 14, may be mobile type devices in that they may be configured to support access to media services from different locations, which are shown for exemplary purposes to be a wireless access point 20 and a home network 22.

The user devices 12, 14, 16, 18 may be configured to support access to any number of media services. The present invention, while predominately described with respect to supporting access to media services offered by satellite, broadcast, and cable television service providers; high speed data service providers; and telephony service providers, fully contemplates its use with any type of media service that relies on signal communications from a service provider, and optionally, where the service provider is able to communicate the signals to different locations 20, 22 and different types of user devices 12, 14, 16, 18. The exemplary illustration of providing television services is set forth to demonstrate one useful aspect of the present invention in so far as supporting IP streaming of television programs and broadcasts to users and one or more of their devices 12, 14, 16, 18 regardless of the location 20, 22 of the user device 12, 14, 16, 18 and the networking medium used to facilitate communication of the related signaling.

The streaming of the television signals may be supported with a cable modem termination station (CMTS) 26 in the case of a cable based communication system configuration or some other analogous devices in the case of satellite, high speed data, and telephony based service provider system configurations. The service provider may include a server 28, headend unit, or other device to support and source television programs, previously recorded video (VOD, PVR, etc.), and other media content (video games, webpages, etc.) to the CMTS 26 for subsequent packaging and transmission to one or more gateways 30, 32 included at each location. The gateways 30, 32, for example, may be cable modems or other network interfaces configured to support message communications between the CMTS 26 and the local user devices 12, 14, 16, 18.

Different networks 36, 38 may be used to support communications with different locations 20, 22 and the gateways 30, 32 may be corresponding configured to support the interfaced network 36, 38. The first gateway 30 is shown as an access point configured to support communications carried over the internet 36 and the second gateway 32 is shown to be a cable modem configured to support communication over a hybrid fibre-coaxial (HFC) network 38. The gateways 30, 32 are also shown for exemplary purposes to facilitate wireless communications with one or more user devices 12, 14, 16, 18 in communication therewith. The wireless communications between the gateways 30, 32 and the user devices 12, 14, 16, 18 may take place according to any protocol or communication standard, such as but not limited to IP. In this manner, IP streaming of television programs may be achieved through wireline communication of television programs from the CMTS 26 to one or more gateways 30, 32 that then wirelessly communicate the television programs to one or more of the user devices 12, 14, 16, 18.

To limit the proliferation of the television programs and other media services to non-authenticated user devices 12, 14, 16, 18, one non-limiting aspect of the present invention contemplates implementing a zero sign-on authentication process. The zero sign-on authentication process may be characterized as allowing user access to any media service previously authorized to be accessed by an associated user depending on a level of trust associated with the gateways 30, 32 being used by user device 12, 14, 16, 18 at time of access. In other words, one non-limiting aspect of the present contemplates a security arrangement where access to subscribers services, and in some cases the degree of access permitted, is predicated on a level of trust the service provider has of the accessing entity at the time of receiving a media request for the media service. The security arrangement of the present invention may include the authentication processing limiting the processing demands on the user devices 12, 14, 16, 18 by determining the level of trust without specifically relying on the user devices 12, 14, 16, 18. The user devices 12, 14, 16, 18, for example, may not be required to provide certificates or to support a sign-on or other operation where a user is required to input a password or other identifying information before being granted access to the media service, i.e., the user is not required to enter a user name and password into a website or other portal each time the media service is requested and/or accessed. The security arrangement of the present invention may also limit the security processing demands of the service provider by not requiring the service provider to track security certificates and to create security related data entries for each of the user devices 12, 14, 16, 18. The system 10 may be configured to meet these advantages with the contemplated zero sign-on authentication process in that it may eliminate the processing demands on the user devices 12, 14, 16, 18, e.g., by relying on processing performed by the gateways 30, 32 and it may eliminate tracking of each user device 12, 14, 16, 18, e.g., by instead only tracking the gateways 30, 32.

Figure 2:
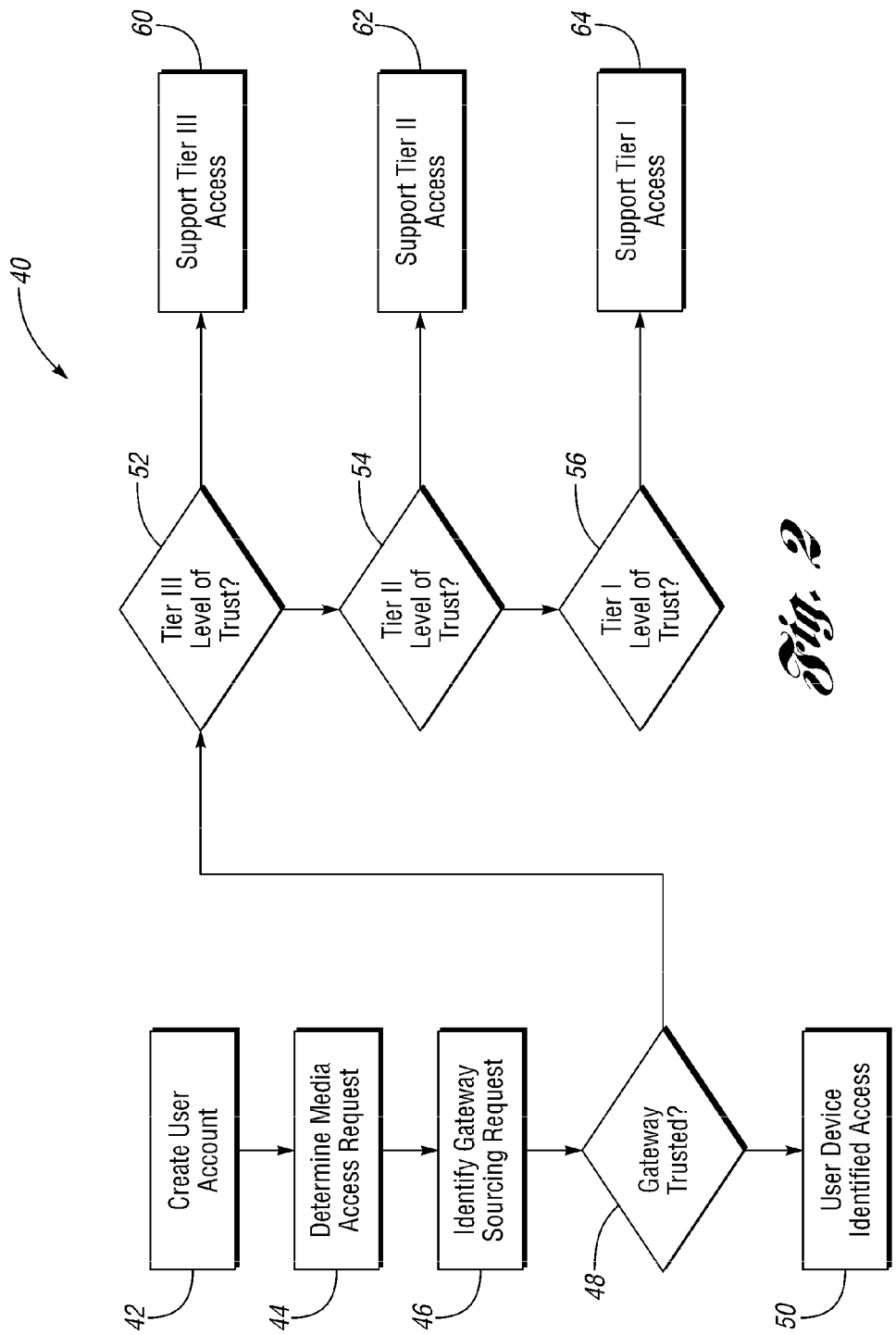
FIG. 2 illustrates a flowchart of a method for facilitating zero sign-on authentication in accordance with one non-limiting aspect of the present invention.

FIG. 2 illustrates a flowchart 40 of a method for facilitating zero sign-on authentication in accordance with one non-limiting aspect of the present invention. Block 42 relates creating a user account for a subscriber or other purchaser of media services from the service provider. The user account may be used to determine entitlements and other information regarding media service authorized for access by a particular user. The entitlements, for example, may be purchased according to tiers of service, which may vary depending on the particular services being offered. With respect to television based services, for example, a first tier of service may relate to purchasing access to non-premium television channels (e.g., broadcasted television channels and other channels that may be included as part of a basic package); a second tier of service may relate to purchasing access to the non-premium channels and premium channels (e.g., movie channels, gaming subscriptions, etc.); and a third tie of service my relate to purchasing access to the non-premium and premium channels and other services, such as but not limited to VOD, PVR (personal video recording stored remotely for the user by the service provider), and/or other services when secure access may be more critical.

The account may be created by a user phoning the service provider to request service and/or by making a similar request through a webpage or other medium. One non-limiting aspect of the present invention particularly contemplates a situation in which a user purchases a gateway or other consumer type device from a source other than the service provider and thereafter requests access to the service provider's service through the device and/or the service provider otherwise providing the gateway without previously securing the assignment and association of its MAC address with the user. As part of the process of creating the user account, the method may include particularly identifying the user with the purchased gateway according to a MAC address of the gateway and addressing used to communication therewith. In the case of the gateway being a cable modem and a cable MSO (service provider) providing the video services, the identification may include associating the MAC address with a domain name of the CMTS or other node used in initially supporting communications with the gateway at the time of creating the user account.

Block 44 relates to the service provider or an authentication entity, such as a server or other entity used by multiple service providers having capabilities to communicate with the user devices, determining issuance of a media access request from one of the user devices. The media access request may take the form of a DNS request, for example, where the user device calls up a webpage offering services of the service provider or otherwise navigates to some sort of menu or graphical user interface, such as an electronic programming guide (EPG), in a manner that results in the user device requesting access to media services. In the case of streaming video, the request may arise from the user device accessing a homepage of the media service provider and without the user clicking on a link or otherwise being forced to take any action within the homepage, i.e., the media access request contemplated by the present invention may be automatically determined as part of the DNS process used to display the service provider's homepage on the user device and without the user having to manual issue the media access request.

Block 46 relates to identifying a gateway used to source or otherwise facilitate communication of the media access request from the user device to the service provider. The determination may be based on information traveling with the media access request as it passes through the gateway and onto the network of the service provider. The gateway, for example, may be identified according to its MAC address or as a function of other identifying characteristics that may be suitable for cross-reference with information included within a database used to store the information associated with the user accounts. As part of this identification process, a level of trust may be determined for the identified gateway. The level of trust may be a 'trust score' or other ranking of the gateway with respect to a likelihood that the gateway is the gateway originally associated with the MAC address.

In some cases, a gateway used to transmit messages may be cloned such that the message passing through it are assigned the MAC address of another gateway instead of the gateway's own MAC address. One aspect of the security contemplated by the present invention may include assessing the likelihood that a gateway or other element sourcing the media access request is clone of another device, i.e., the trustworthiness of the gateway being who the gateway says it is. As noted below, the authentication process used to permit access to the service provider's media service may be based on an identification of the gateway and not an identification of the user device. Since this type of identification methodology is not based on the user device, one may only need to clone the gateway of another to freely access media service paid for by someone else. One non-limiting aspect of the present invention contemplates counteracting this concern by making an inquiry into the authenticity of the gateway and ranking that inquiry according to a level of trust.

The metrics and information collected to determine the level of trust may vary according to the configuration of the gateway and the means by which it interfaces signals with the user device. A cable modem, for example, is typically a stationary device located with a home network or other fixed network. It is unlikely that the cable modem will frequently move from one location to another, and a node, CMTS, or other similar fixed device used to communicate with the cable modem is similarly unlikely to change locations, allowing for an approximate physical location of the gateway to be determined from the domain name of the CMTS with which it communicates to be one factor reflective of the level of trust. If the MAC address and domain name traveling with the media access request match with a MAC and address and domain name combination included with the user account database, then that may be one indication that the gateway is trustworthy.

While a cloned gateway and a non-cloned gateway cannot simultaneously operate effectively on the same node, they can operate effectively on the same node when the other is inactive. As such, simply relying on a match of the MAC address and domain name may not be a sufficient representation of the trustworthiness of the gateway. An additional factor of trustworthiness may be whether the service provider is able to support SNMP communications with the gateway. The ability to support SNMP communication means the service provider is able to 'ping' the gateway through known, and trusted, addressing techniques, i.e., it may be unlikely of an SNMP 'ping' issued to a non-cloned gateway to reach a cloned gateway. Another additional factor of trustworthiness may be whether the gateway is actively supporting Baseline Privacy Interface Plus (BPI+) or some other certification based privacy system by which the service provider would assign a certificate to each gateway that would be difficult for a cloned device to copy.

Once the information reflective of the trustworthiness of the gateway is collected, such as through an electronic query, an analysis of the information may be used to determine whether any of the factors point to some level of trustworthiness. If none or so few of the factors indicate a sufficient level of trust, then the gateway may be determined to be untrustworthy and Block 50 is reached. Even though the gateway may be untrustworthy, the subscribers may still be entitled to access media services at non-trusted locations. As such, Block 50 allows for a secondary authentication process to occur where the user device making the media access request is identified, with a login process or an automatic certificate exchange process (e.g., the user account can specify and assign certificates to MAC address and other specifically identified user devices). Properly identified user devices can then be used to access purchased services through any gateway and not just the one or more gateways associated with the corresponding user's user account.

In the event Block 48 determines the user device to be associated with a gateway having some level of trust, there may be no need to specifically identify the user device through the sign-on process of Block 50. The level of trust determined for the gateway may instead be used to assess whether it meets the highest levels of trust, referred to a Tier III, in Block 52. A Tier III level of trust may be determined if the gateway positively passes each of the three tests described above (e.g., matching MAC address and domain name, SNMP communication, and BPI+). Thereafter, a Tier II or Tier I level of trust may be determined in Blocks 54, 56 depending respectively on whether the gateway passes at least two of the tests and at least one of the tests. Depending on the corresponding level of trust, a level of access allowed to the access device is determined in Blocks 60, 62, 64 to be one of the first, second, and third tiers of services noted above. Once the tier of service is determined, an automatic authentication or other process may take place between the service provider and user device to facilitate delivery of signaling, firmware, etc. needed by the user device to access to the desired media service (e.g., message exchange may take place to instigate streaming of a desired television channel to the user device). This authentication may take place in a manner that is transparent to the user and without requiring the user to input any information into the user device.

As supported above, one non-limiting aspect of the present invention relates to a means for providing users access to certain applications, services, etc, based on access via trusted devices without the need for additional user credentials. This may be accomplished using information about the level of trust or level of assurance associated with a device and a distributor, such as a content distributor or service provider, determining whether or not to provide content/service to other devices connecting via the trusted device. One example may include the original CMTS being known to serve a given neighborhood such that when the customer subscribes to receive broadband services, the customer's modem is then associated with a street address as well as associated with a specific CMTS. The cable operator can, therefore, know that the modem street address is within service area of a particular CMTS and a relationship between the cable modem, the CMTS and the street address can be used to identify which cloned modems from a geographical area are being used most frequently with a CMTS, which can also be identified with a geographical area. Optionally, trust may be established by ensuring customer premise wireless router is secured wherein the following trust characteristics of a modem may be analyzed:

1. Correct domain mapping
2. Correct configuration file (CMTS identifies the original configuration file and, therefore can identify when the modem configuration file is changed
3. BPI+ Enforce is on (digital certificate) modem MAC address is associated with appropriate digital certificate can limit clones because physical access to the flash memory of the device may be required to clone these types of devices. The CMTS will only talk with modems in BPI+. (BPI+ Enforce is an ECR to the DOCSIS 3.0 Spec).
4. Polling of all CMTSs for duplicate MAC addresses.
5. Modem running the correct software version (SNMP management. MIB exists).
6. Wireless is locked These factors can then be used to create a "Trust Score." If all these factors are met, then the modem can be used for zero sign-on (no need for user name password) for streaming video/audio/gaming. If some factors are deficient, the cable operator can request user name/password and/or provide less service such as lower resolution streaming services, and/or disallow access to some content. This would be done by having the operator have preset values for each of the characteristics of a trusted modem, using those values to create a weighted average and having prearrange agreements with video providers as to what content is associated with what level of trust for the modem. The cable operator can limit the number of zero sign-ons to a limited number of devices per customer so that the customer cannot freely share their purchased services with too many other individuals. The customer may have a limited number of devices to allow zero sign-on so that if a new device came on that would exceed the number of devices allowed the customer would have to remove a device that is currently authorized before supporting zero sign-on with the new device. In some cases, some service may be eliminated from the zero sign-on process, such as but not limited to parental controls, account information, device authorization. Additional trust may also be established when wireless IP devices that are physically attached to the home, such as locks, utility monitoring devices, and large appliances, are secured so as to communicate only through the customer's modem, then the address of all the mobile devices in the home may be trusted as they are communicating through the same modem as the attached devices. These mobile devices may then receive certain services and content that are provided to that home.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing zero sign-on authentication comprising:

identifying a gateway through which a first user device issues a media access request for media services, the media access request being generated through user interaction with a webpage connected to through signaling carried via the gateway;

establishing a gateway level of trust for the gateway following issuance of the media access request, the gateway level of trust being determined based on gateway identification information electronically collected from the gateway, at least part of the gateway identification information being unique to the gateway;

after establishing the gateway level of trust, authenticating the first user device to access the media service depending on the gateway level of trust, including automatically limiting media services made accessible to the first user device through the gateway to a certain portion of the media services depending on the gateway level of trust;

establishing the gateway level of trust with a server in electronic communication with the gateway, the server determining the gateway level of trust based on a comparison of information collected from the gateway to data previously associated with the gateway;

granting the first user device limited access to facilitate communications with the server via the gateway prior to determining the gateway level of trust, the limited access allowing the first user device to interact with the webpage;

establishing the gateway level of trust to be one of a first, second, and third level of trust depending on whether the server supports Simple Network Management Protocol (SNMP) communications with the gateway, whether the server supports a privacy certificate exchange with the gateway, and whether a Media Access control (MAC) address of the gateway has the same domain name as a domain previously associated with the MAC address;

authenticating the first user device to a first tier of the media service if the first user device is determined to have the first level of trust, authenticating the first user device to a second tier of the media service if the first user device is determined to have the second level of trust, and authenticating the first user device to a third tier of the media service if the first user device is determined to have the third level of trust; and authenticating a second user device to access the same certain portion of the media services through the gateway as function of the gateway level of trust regardless of an identity of the second user device and regardless of an identity of a user of the second user device.

2. The method of claim 1 further comprising determining the gateway level of trust without collecting information used to establish the gateway level of trust from the first user device.

3. The method of claim 1 further comprising authenticating the first user device without requiring a user of the first user device to contemporaneously complete a sign-on operation.

4. The method of claim 1 further comprising authenticating the first user device without requiring a user of the first user device to complete a sign-on operation.

5. The method of claim 1 further comprising authenticating the first user device without relying on the first user device to transmit certificates.

6. The method of claim 1 wherein the media service available within the first tier is limited to viewing of non-premium television channels, wherein the media service available within the second tier is limited to viewing of non-premium and premium television channels, and wherein the media service available within the third tier is unlimited and includes viewing of non-premium and premium television channels as well as viewing of previously recorded, personal media.

7. The method of claim 1 wherein the server collects the information used for the comparison proximate in time to the service provider receiving the media request, the information allowing to facilitate approximating a current physical location of the gateway, the current physical location being compared to a previously physical location of the gateway to facilitate establishing the gateway level of trust, including establishing the gateway level trust to be greater when the current physical location matches the previous physical location than when the current physical location fails to match the previous physical location.

8. The method of claim 7 wherein the gateway supports access to the media service by interfacing wireline signals used to communicate with the service provider with wireless signals used to communicate with the first user device.

9. The method of claim 1 further comprising:

establishing a user level of trust for a user of the first device, the user level of trust being determined based on user identification information collected from the user as part of a sign-on operation, the user level of trust being unique to the user and independent of the gateway level of trust; and allowing the first user device to access additional media services beyond the certain portion of media services depending on the user level of trust.

10. A method of authenticating user devices to access a media service available from a service provider when at least a portion of signaling used to support access to the media service is exchanged through a gateway configured to interconnect one or more user devices with the service provider, the method comprising:
 for each user device requesting access to a media service, determining a level of trust for each gateway used to support signaling therewith;
 authenticating the user devices requesting access to the media service to access certain portions of the media service depending on the level of trust determined for the gateway used to support signaling therewith such that user devices connected to gateways having greater levels of trust are permitted access to larger portions of the media service than gateways having lesser levels of trust;
 authenticating each user device connected to the same gateway to the same certain portions of the media service regardless of a user associated therewith;
 determining the level of trust for each gateway to be one of a first, second, and third level of trust depending on whether the gateway supports Simple Network Management Protocol (SNMP) communications with the gateway, whether the gateway supports a privacy certificate exchange or whether a Media Access Control (MAC) address of the gateway has the same domain name as a domain name previously associated with the MAC address;
 authenticating a first user device of the user devices to a first tier of the media service if the first user device is determined to be requesting access to the media service through one of the gateways having the first level of trust, authenticating the first user device to a second tier of the media service if the first user device is determined to be requesting access to the media service through one of the gateways having the second level of trust, and authenticating the first user device to a third tier of the media service if the first user device is determined to be requesting access to the media service through one of the gateways having the third level of trust.

11. The method of claim 10 wherein authenticating at least one of the user devices includes:
 prior to the at least one of the user devices performing a sign-on operation, providing the at least one of the user devices with decryption keys suitable for decrypting one or more television channels of the service provider, wherein the number of television channels suitable for decryption with the decryption keys is proportional to the level of trust of the gateway; and
 following the at least one of the user devices performing the sign-on operation, providing each signed-on user device access to more television channels than the number of television channels available based on the level of trust of the corresponding gateway.

12. The method of claim 10 further comprising determining the user devices requesting access to the media service as a function of signaling carried through the gateway, the signaling being representative of user interaction with a graphical user interface, an electronic programming guide (EPG) or Web page used to facilitate requesting the media service, the media service, and thereby the certain portions of the media service, being one of one or more media services offered through the graphical user interface, the EPG or the Web page, the user devices being granted access to the graphical user interface, the EPG or the Web page through one of the gateways prior to being authenticated to access the certain portions of the media service.

13. A system for supporting zero sign-on authentication to a media service comprising:
 a provider network used to carry signaling associated with sourcing of the media service;
 a plurality of gateways configured to interface the signaling of the provider network with one or more of the user devices; and
 a server computer configured to:
  electronically query the plurality of gateways for information;
  determine a level of trust for each of the gateways from the information;
  determine a media access request for each user device attempting to access the media service, the media access request being transmitted through the gateway connected to each user device attempting to access the media service;
  authenticate each user device associated with at least one media access request to access certain portions of the media service according to the level of trust of the gateway connected thereto such that at least a first gateway is provided access to more of the certain portion than at least a second gateway due to the level of trust of the second gateway being less than the level of trust of the first gateway, the level of trust for each gateway being determined at least based in part on information included with the corresponding media access request;
 wherein the server determines the level of trust for each gateway as a trust score, the trust score increasing with each positive metric, the metrics including (i) whether the server supports Simple Network Management Protocol (SNMP) communications with the gateway, (ii) whether the server supports a privacy certificate exchange with the gateway or (iii) whether a Media Access Control (MAC) address of the gateway has the same domain name as a domain previously associated with the MAC address, wherein the first gateway is determined to have more positive metrics than the second gateway; and
 authenticating a first user device of the user devices to a first tier of the media service if the first user device is determined to be requesting access to the media service through the first gateway having the first level of trust, authenticating the first user device to a second tier of the media service if the first user device is determined to be requesting access to the media service through the second gateways having the second level of trust, and authenticating the first user device to a third tier of the media service if the first user device is determined to be requesting access to the media service through a third gateways having the third level of trust.

14. The system of claim 13 wherein the server automatically authenticates each user device interfacing signals with the same one of the gateways to the same certain portion of the media service regardless of an identity of each user device and a user thereof and wherein the server determines the level of trust for each gateway based at least in part on Dynamic Name System (DNS) data include as at least part of the information.

15. The system of claim 13 wherein, in the event one of the gateways is determined to be untrustworthy, the server thereafter authenticates user devices connected thereto to access the certain portion of the media service if the user devices successfully complete a sign-on process or provide sufficient trust certificates, the sign-on process and the trust certificates each uniquely identifying a user of the corresponding user device, thereby providing a user level of trust that is independent of the level of trust determined for the corresponding gateway.

* * * * *